April 23, 1957 — D. M. SOLENBERGER — 2,789,641
MULTIPLE PARTING-OFF TOOL

Filed Nov. 30, 1954 — 3 Sheets-Sheet 1

INVENTOR.
DEAN M. SOLENBERGER
BY Bosworth, Sessions,
Herrstrom & Lawler
ATTORNEYS.

April 23, 1957 D. M. SOLENBERGER 2,789,641
MULTIPLE PARTING-OFF TOOL

Filed Nov. 30, 1954 3 Sheets-Sheet 2

INVENTOR.
DEAN M. SOLENBERGER
BY
ATTORNEYS.

April 23, 1957   D. M. SOLENBERGER   2,789,641
MULTIPLE PARTING-OFF TOOL
Filed Nov. 30, 1954   3 Sheets-Sheet 3

INVENTOR.
DEAN M. SOLENBERGER
BY
ATTORNEYS.

United States Patent Office 2,789,641
Patented Apr. 23, 1957

2,789,641

MULTIPLE PARTING-OFF TOOL

Dean M. Solenberger, Miami, Fla., assignor to Simplex Piston Ring Mfg. Company, a corporation of Ohio Application November 30, 1954, Serial No. 471,999

8 Claims. (Cl. 164—36)

This invention relates to metal working and more particularly to improvements in lathe tools and holders therefor whereby a plurality of parting-off operations may be simultaneously performed.

When it has been desired to produce a thin disc or washer-like article from bar stock the usual practice has been to chuck the stock in a suitable lathe or the like, and cut off the desired portion by means of a "cut-off" tool of well known type mounted on the tool post of the lathe. If a washer is desired rather than a disc, the stock is first drilled or bored (usually in the lathe) to form a hole of the desired size therein and the washers may be then cut off from the end of the stock one at a time by the cut-off tool. This procedure serves the purpose where only a few parts are required but production is necessarily slow because each part requires a separate cut by the tool and this practice is not satisfactory for high production operations.

It is an object, therefore, of the present invention to provide an efficient, high speed multiple parting-off tool which may be used for simultaneously cutting off a plurality of discs or washers from bar stock, tube, pipe, etc. Other objects of my invention are the provision of a multiple parting-off tool whereby a minimum of material will be wasted as scrap, a plurality of cuts can be made simultaneously and the parts will be severed from the stock without danger of premature breaking off prior to completion of all of the cuts, relatively great depths of cut may be performed, the heat generated during the cutting operation may be effectively dissipated without injury to the tools, and the severed articles will be substantially free of undesirable burrs or the like. A further object of my invention is the provision of a multiple tool holder or box whereby individual tools may be readily positioned as desired, which is rugged and relatively inexpensive to manufacture and maintain, and which makes possible the simultaneous sharpening of all of the tools in a single operation at exactly the proper angles and contours by unskilled personnel.

The above and other objects of my invention will appear from the following description of one embodiment thereof, reference being had to the accompanying drawings in which.

Figures 1, 2:
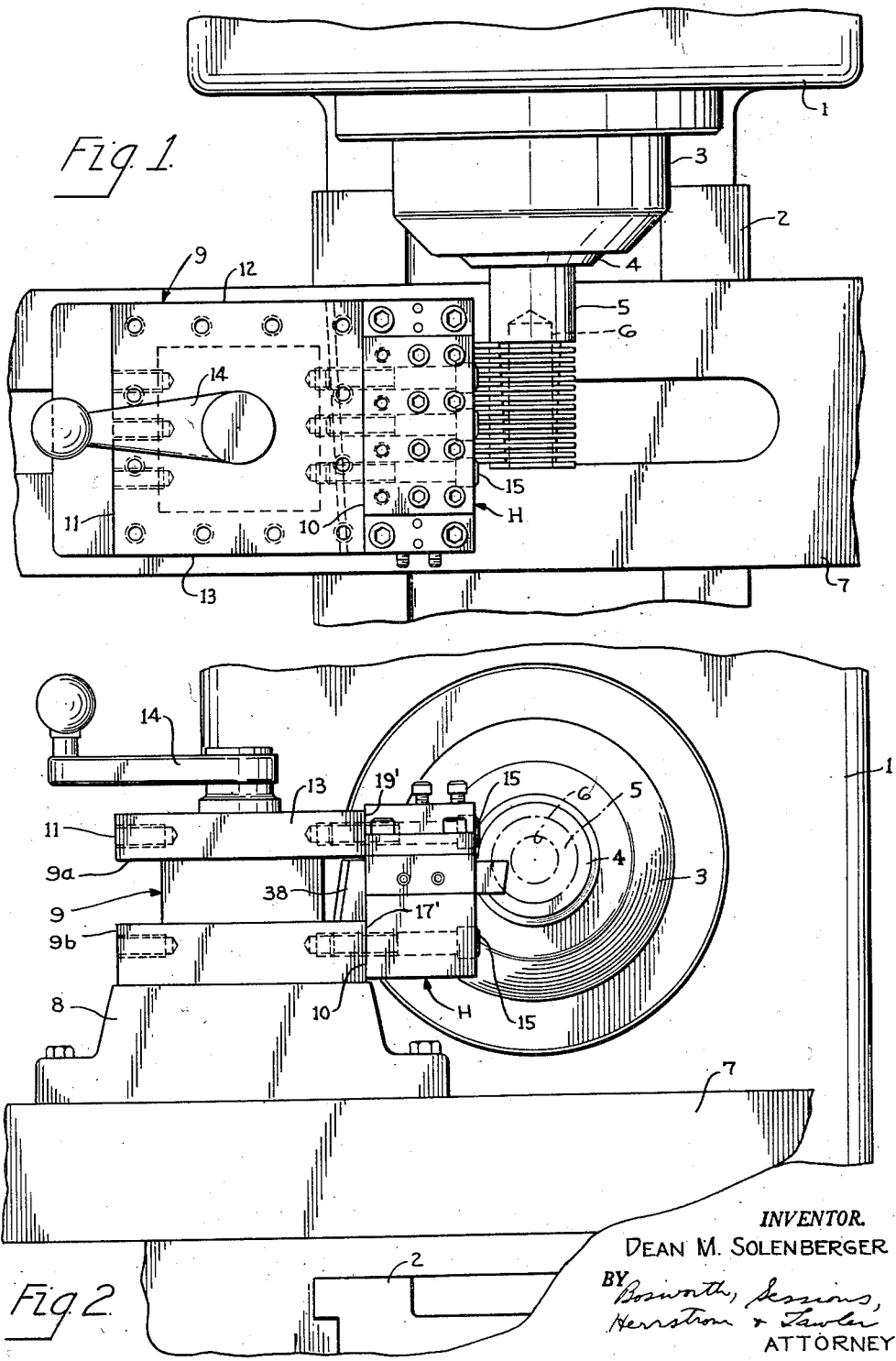
Figure 1 is a plan view of a portion of a turret lathe or the like with a piece of drilled out bar stock gripped in the collet thereof, and with my improved parting-off tool in operating position simultaneously to produce a plurality of washers.
Figure 2 is an end elevation of the apparatus shown in Figure 1 looking toward the end of the bar stock.

In my improved tool holder a plurality of thin bladelike cut-off tools are supported in a box or housing in side by side relation spaced apart the distance required to give the proper thickness of the parts being cut off. The cutting edges of the successive tools are so disposed relative to the tool housing or box, and the tool housing or box is so mounted on the cross slide of the lathe, that a line drawn through the cutting edges of all of the tools is not parallel to the axis of rotation of the stock but rather recedes therefrom, the cutting edge of the tool most remote from the head stock of the lathe being closest to the axis of rotation. By virtue of this arrangement, when the tools are simultaneously fed radially inwardly, the tool with its cutting edge farthest advanced toward the work will engage the work first and the other tools will successively start their cuts as the tool holder is fed toward the axis of rotation of the work. This arrangement prevents the entire cutting load from being imposed instantaneously at the beginning of the cut and effects a successive completion of the cuts whereby the disc or washer most remote from the head stock of the lathe is severed first and each succeeding part is cut off in succession. By this arrangement excessive torque is never applied to the stock by the cutting tools and all danger of having the stock break off at a point inward from the end part, with resulting jamming, breakage of tools, and loss of parts, is eliminated.

If a plurality of cut-off tools are mounted with their cutting edges the same distance from the axis of the stock, the extremely severe torque set up by the simultaneous cuts of the multiple tools will cause the stock to break off when the tools get close (for example within about $\frac{1}{32}$ inch) of the inner end of the cut. As this break may occur at any one of the several cutting tools it has been a practical bar to the successful use of multiple cut-off tools for forming washers or the like prior to my invention. As will appear more fully from the following detailed description, with my improved tool the discs or washers drop off successively one at a time as the respective cuts are completed and there is no danger of stock breakage caused by the cutting torque.

Referring to the drawings, the head stock of a turret lathe or the like is indicated at 1 and the lathe bed at 2. The usual collet hood 3 and collet 4 are provided and the bar stock 5 is gripped by the collet 4 and projects outwardly the desired distance into the path of the cutters of the parting-off tool H. Although my invention is applicable to severing solid discs I have illustrated the setup as used for making thin flat washers. For this purpose it is of course necessary, before cutting off the washers, to first drill or bore a hole 6 inwardly into the bar stock 5 from its outer end. This may be done by any suitable tool mounted on a turret or other tool holder (not shown) and fed axially inwardly into the end of the bar stock in well known manner.

The cross slide 7 of the lathe supports the tool post 8 and is adapted to be fed transversely at right angles to the axis of rotation of the stock 5. Tool post 8 may assume any of the various usual forms and, as illustrated, has a rotatable head or turret portion 9. This turret 9 is rectangular, having tool mounting faces 10, 11, 12 and 13 and being provided with a releasable clamp 14 and suitable indexing means (not shown) whereby turret 9 may be locked in position with the face 10 (or any one of its other three faces) exactly parallel to the lathe axis.

My improved parting-off tool assembly is generally indicated in Figures 1 and 2 at H and is secured to the edge face 10 of the turret 9 by screws 15 which extend through holes 16 in the base block 17 and holes 18 in the top member 19. End blocks 20 and 21 space the base block 17 and the top member 19 apart (see Figure 5). In order properly to locate the parts, taper pins 22 extend through the top member 19 and the end block 20 into the base 17 while similar taper pins 23 extend through the end block 21. Cap screws 24 serve to clamp the properly located parts together to form an open sided box or housing. The bottom wall of this housing is formed by base block 17, the top wall by top member 19 and the end walls by end blocks 20 and 21.

Figure 4:
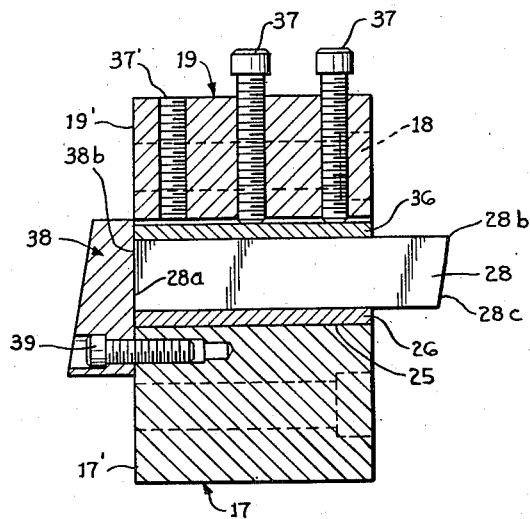
Figure 4 is a vertical cross-sectional view taken on line 4—4 of Figure 3.

As seen in Figures 1, 2 and 4, the inner side surfaces 17' and 19' of the base and top members 17 and 19 form flat attaching faces which are clamped against the face 10 of turret 9 by the screws 15. Furthermore, it will be noted that the housing walls just referred to define a tool receiving aperture, indicated at A in Figure 5, which extends into the housing from the side opposite the attaching face portions 17' and 19', and the inner surface of end wall 21 forms an end face of the tool receiving aperture. This end face extends perpendicularly to the attaching face 17'—19' whereby, as will appear later, the individual tools are held in perpendicular relation to the attaching face and thus also to the lathe axis.

The top face of base block 17 is recessed at 25 (Figure 5) to accommodate a removable tool supporting plate 26, preferably of hardened steel. In the illustrated embodiment of my invention I have shown thirteen separate cutting tools so supported that twelve individual pieces are simultaneously cut off in a single operation. The first two of these cutting tools are identified by reference numbers 27 and 28 and the last two by numbers 29 and 30. Each tool comprises an elongated, thin, flat, blade-like member disposed on edge (Figure 4) and having, as seen on tool 28, a squared off rear end portion 28ᵃ, a cutting edge 28ᵇ, and a relieved end face 28ᶜ.

The thirteen cutting tools, when assembled in the tool holder, rest on their lower edges on the supporting plate 26. The adjacent tools are spaced apart by spacers 31 which are of proper thickness to produce washers or discs of the desired thickness. These spacers 31, as will be observed from Figures 3 and 4, preferably extend only for the width of the base block 17, thus leaving the cutting tools projecting freely outwardly beyond the face of the housing sufficiently far to enable the desired depth of cut to be produced.

In order to locate the tools and clamp them laterally between the end blocks 20 and 21, suitable spacer blocks 32, 33 and 34 are disposed on the supporting plate 26. Spacer 34 rests against the inner face of end block 21 and serves to space the last tool 30 the desired distance inwardly from said end block and perpendicular to the attaching face 17'—19'. The spacers 32 and 33 are merely fillers and might be thicker or thinner, depending on whether more or less tools are to be employed. Clamping screws 35 extend through the end block 20 and when tightened are adapted to clamp the entire assembly of cut-off tools and spacers firmly together and prevent lateral movement thereof.

Figure 3:
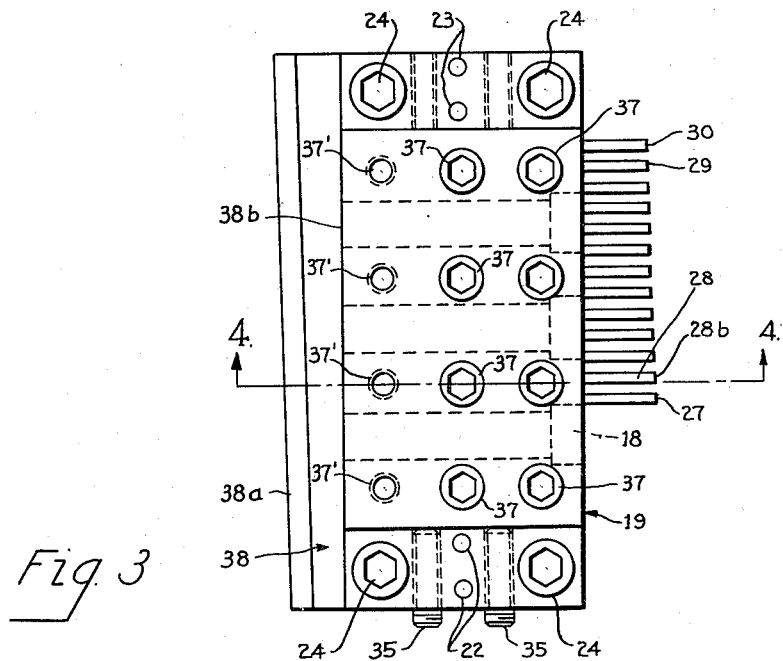
Figure 3 is an enlarged detached plan view of my improved multiple parting-off tool assembly.
Figure 5:
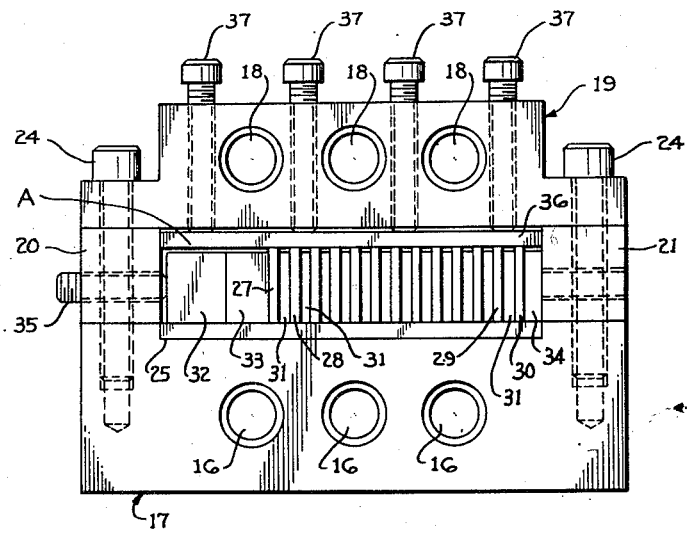
Figure 5 is a front elevational view, looking at the cutting ends of the individual tools, of the tool holder shown in Figure 3.
Figure 6:
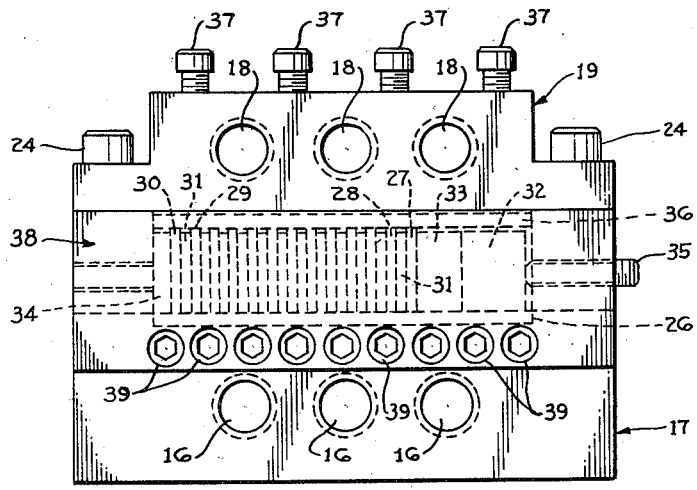
Figure 6 is a rear elevational view of the tool holder assembly shown in Figures 3, 4, and 5.

A top tool clamping plate 36, preferably of hardened steel and generally similar to bottom tool supporting plate 26, rests on the top edges of the series of tools. As seen in Figure 5 the spacers 31 are preferably slightly less in height than the tools so that the clamping plate 36 engages only the tops of the tools. A plurality of clamp screws 37 have threaded mounting in the top member 19. The lower ends of these screws engage the top of the plate 36 and force it downwardly to clamp the tools firmly against possible vertical movement or vibration. As seen in Figure 3 an additional row of threaded holes 37' are provided for accommodating more clamp screws 37 if desired.

As previously noted, the inner ends of the individual cut-off tools 27, 28, etc., are squared off. When the tool is assembled these squared off ends abut the inner face 38ᵇ of a tool abutment and angle plate member 38 which is secured by a plurality of countersunk screws 39 to the rear face 17' of the base block 17 and extends across and forms a rear wall for the tool receiving aperture. As the face 38ᵇ extends at right angles to the inner face of end block 21, and as the tools 27, spacer blocks 31, and additional spacers 32, etc., are all of uniform thickness where they engage each other, the individual tools 27, etc., are all disposed in parallel relation to each other and extend perpendicularly to the rear faces 17' and 19' of the top and bottom members 17 and 19, and also perpendicularly to the supporting plate 26.

As best seen in Figure 2, the height of the abutment and angle plate member 38 is less than the space between the top and bottom flange portions 9ᵃ and 9ᵇ of the turret 9, thus permitting the angle plate 38 to be disposed between said flange portions when the tool unit is secured in position on the turret 9 by the screws 15 (Figures 1 and 2).

The rear or outer face 38ᵃ of abutment and angle plate member 38 extends at an angle (when seen in plan view) to the rear attaching face 17' of base block 17, being thickest at the end adjacent the head stock of the lathe and thinnest at the remote end. As clearly seen in the end elevation of Figure 4, the outer face 38ᵃ of member 38 also extends at an angle to the vertical, being thinnest at the top and thickest at the bottom. Thus it may be stated that the outer or angle face portion 38ᵃ of the housing lies in a plane which extends angularly to the plane of the attaching face portion 17'—19' in both the horizontal and vertical directions.

It will be noted from Figure 3 that a line drawn through the cutting edges of the individual tools 27, 28, etc., is exactly parallel to the angle face 38ᵃ of member 38 and it will also be noted from Figure 4 that the relieved forward end (28ᶜ on tool 28) of each of the individual tools is exactly parallel to the vertical slope or pitch of the outer angle face 38ᵃ of angle plate 38. The above described arrangement of the face 38ᵃ makes it possible to resharpen the entire series of tools 27, etc., in a single operation by merely removing the holding screws 15, placing the angle face 38ᵃ of the tool housing on a flat surface such as the magnetic chuck face of a surface grinder, and then traversing the entire assembly horizontally under the rotating abrasive wheel of the grinder. This results in accurate and rapid resharpening of all of the tools, gives them the proper relief on their forward edges, and also gives the desired step-back to the successive tools of the series so that the first tool 27 will complete its cut first and then each succeeding tool will cut off its particular piece. As seen in Figure 1 this step back of the tools causes a greater amount of stock to be retained at each succeeding cut and provides sufficient strength to prevent premature breaking off between any particular pair of cut-off tools due to the torque applied to the stock by the cutting operation.

By varying the horizontal angle of the surface 38ᵃ relative to the rear face 17' of base block 17 (and accordingly relative to the axis of rotation of the bar stock 5) the exact degree of step back desired may be readily obtained. Furthermore, by varying the vertical angle of the rear face 38ᵃ the degree of relief on the forward edges of the cutting tools may be varied as desired.

As noted above, my improved parting-off tool is readily adaptable to cutting off parts of different thickness and the number of parts cut in a single operation may be varied by changing the number of cut-off tools employed. The hardened steel bottom tool support 26 and the top clamp plate 36 are readily replaceable. This is particularly desirable in protecting the tool holder housing against damage in case defective steel is encountered resulting in breakage of one or more of the tools. Such an occurrence might cause injury to the housing were it not for these top and bottom plates which may be readily replaced should they be damaged. Assembly of the individual tools in my holder is readily accomplished without special skill and in a minimum of time. The cutting blades and spacers are merely positioned within the housing with their rear edges abutting the forward face of the abutment and angle plate member 38 and the clamp screws 35 and 37 tightened. Although the individual tools may be rough ground before assembly, accuracy is not essential as, after the tool blanks are clamped in the holder, the entire unit may be mounted on the chucking face of a surface grinder or the like and the proper relief and stepback given to all of the tools in a simple grinding operation which insures absolute accuracy and uniformity. As has been previously noted, the angle plate also makes possible simultaneous resharpening of all of the tools to produce the proper cutting edges and the exact angle and step-back automatically and by relatively unskilled labor.

Although I have described the illustrated embodiment of my parting-off tool in considerable detail it will be understood that variations and modifications may be made in the form and proportion of the parts and in the general arrangement thereof without departing from the scope of my invention. I do not therefore wish to be limited to the exact structure herein shown and described but claim as my invention all embodiments thereof coming within the scope of the appended claims.

I claim:

1. In a parting-off tool or the like, a housing having a tool receiving aperture, a flat attaching face portion on one side of said housing, said tool receiving aperture extending inwardly from the opposite side of said housing, said aperture having an end face extending perpendicularly to said attaching face portion, a tool abutment and angle plate member extending across and forming a rear wall for said tool receiving aperture, the inner face of said abutment and angle plate member extending perpendicularly to said aperture end face, and the outer face of said abutment and angle plate member lying in a plane which extends angularly to the plane of said attaching face portion in both the horizontal and vertical directions, and a plurality of tools in said tool receiving aperture disposed with their inner ends in abutting engagement with said inner face of said abutment and angle plate member.

2. In a parting-off tool or the like, a housing having a tool receiving aperture, a flat attaching face portion on one side of said housing, said tool receiving aperture extending inwardly from the opposite side of said housing, said aperture having an end face extending perpendicularly to said attaching face portion, a tool abutment and angle plate member extending across and forming a rear wall for said tool receiving aperture, the inner face of said abutment and angle plate member extending perpendicularly to said aperture end face, the outer face of said abutment and angle plate member lying in a plane which extends angularly to the plane of said attaching face portion in both the horizontal and vertical directions, a plurality of cut-off tools in said aperture, means for spacing said tools apart, and means for releasably securing said tools in said aperture, said tools having their inner ends in engagement with said inner face of said abutment and angle plate member and their outer ends projecting beyond said opposite side of said housing and having cutting edges disposed in stepped-back relation to said attaching face portion.

3. In a parting-off tool or the like, a housing having a tool receiving aperture, a flat attaching face portion on one side of said housing, said tool receiving aperture extending inwardly from the opposite side of said housing, said aperture having an end face extending perpendicularly to said attaching face portion, a tool abutment and angle plate member extending across and forming a rear wall for said tool receiving aperture, the inner face of said abutment and angle plate member extending perpendicularly to said aperture end face, the outer face of said abutment and angle plate member lying in a plane which extends angularly to the plane of said attaching face portion in both the horizontal and vertical directions, a plurality of cut-off tools in said aperture, means for spacing said tools apart, and means for releasably securing said tools in said aperture, said tools having their inner ends in engagement with said inner face of said abutment and angle plate member and their outer ends projecting beyond said opposite side of said housing and having cutting edges disposed in stepped-back relation to said attaching face portion, the ends of each of said tools adjacent said cutting edges being relieved at the same angle.

4. In a parting-off tool or the like, a housing having a tool receiving aperture, a flat attaching face portion on one side of said housing, said tool receiving aperture extending inwardly from the opposite side of said housing, said aperture having an end face extending perpendicularly to said attaching face portion, a tool abutment and angle plate member extending across and forming a rear wall for said tool receiving aperture, the inner face of said abutment and angle plate member extending perpendicularly to said aperture end face, the outer face of said abutment and angle plate member lying in a plane which extends angularly to the plane of said attaching face portion in both the horizontal and vertical directions, a plurality of cut-off tools in said aperture, means for spacing said tools apart, and means for releasably securing said tools in said aperture, said tools projecting beyond said opposite side of said housing and having cutting edges disposed in stepped-back relation to said attaching face portion, a line through all of said cutting edges being parallel to said plane of said outer face of said abutment and angle plate member.

5. In a parting-off tool or the like, a housing having a tool receiving aperture, a flat attaching face portion on one side of said housing, said tool receiving aperture extending inwardly from the opposite side of said housing, said aperture having an end face extending perpendicularly to said attaching face portion, a tool abutment and angle plate member extending across and forming a rear wall for said tool receiving aperture, the inner face of said abutment and angle plate member extending perpendicularly to said aperture end face, the outer face of said abutment and angle plate member lying in a plane which extends angularly to the plane of said attaching face portion in both the horizontal and vertical directions, a plurality of cut-off tools in said aperture, means for spacing said tools apart, and means for releasably securing said tools in said aperture, said tools projecting beyond said opposite side of said housing and having cutting edges disposed in stepped-back relation to said attaching face portion, the ends of each of said tools adjacent said cutting edges being relieved at the same angle, a line through all of said cutting edges being parallel to said plane of said outer face of said abutment and angle plate member, and said relieved ends of said tools also being parallel to said plane.

6. In a parting-off tool or the like, a housing having a base block member, a top member, end blocks disposed between and at each end of said base block and top members, and an attaching face portion; a plurality of cut-off tools disposed between said base block member and top member and projecting from said housing perpendicularly to said attaching face portion, spacer members for locating said tools between said end blocks, means for clamping said tools and spacer members between said end blocks, a removable tool supporting plate between the bottom edges of said tools and said base block member, a removable top clamp plate between the upper edges of said tools and said top member, means for clamping said tools between said removable plates, and an angle plate member having an outer face portion lying in a plane angularly disposed in both horizontal and vertical directions relative to said attaching face portion at angles the same as the setback and relief angles of the cutting ends of said tools.

7. In a parting-off tool or the like a housing having a base block member, a top member, end block members disposed between and at each end of said base block and top members, and an attaching face portion, said members defining a tool receiving aperture; clamping means for securing a plurality of tools in said aperture against movement relative to said base block member and top member, and an angle plate member having an outer face portion lying in a plane angularly disposed in both horizontal and vertical directions relative to said attaching face portion at angles the same as the setback and relief angles of the cutting ends of said tools.

8. In a parting-off tool or the like a housing having a base block member, a top member, end block members disposed between and at each end of said base block and top members, and an attaching face portion, said members defining a tool receiving aperture; clamping means for securing a plurality of tools in said aperture against movement relative to said base block member and top member, an angle plate member having an outer face portion lying in a plane angularly disposed in both horizontal and vertical directions relative to said attaching face portion at angles the same as the setback and relief angles of the cutting ends of said tools, and an inner face portion extending across the rear of said aperture perpendicularly to an end wall thereof.

References Cited in the file of this patent

UNITED STATES PATENTS

| | | |
|---|---|---|
| 662,492 | Mingst | Nov. 27, 1900 |
| 745,976 | Tindel | Dec. 1, 1903 |
| 966,658 | Crick | Aug. 9, 1910 |
| 1,694,560 | Parish | Dec. 11, 1928 |
| 2,289,155 | Weideuer | July 7, 1942 |
| 2,363,160 | Sundstrom | Nov. 21, 1944 |
| 2,475,049 | Premo | July 5, 1949 |

FOREIGN PATENTS

| | | |
|---|---|---|
| 414,798 | Italy | Aug. 31, 1946 |